United States Patent [19]

Brayman et al.

[11] Patent Number: 4,754,638
[45] Date of Patent: Jul. 5, 1988

[54] APPARATUS AND METHOD FOR LEAK TESTING AUTOMOTIVE WHEEL RIMS

[75] Inventors: Semyon Brayman, Southfield; Vladimir Sheyman, Birmingham, both of Mich.

[73] Assignee: Antares Engineering, Inc., Madison Heights, Mich.

[21] Appl. No.: 873,518

[22] Filed: May 23, 1986

[51] Int. Cl.[4] .............................................. G01M 3/20
[52] U.S. Cl. ................................................. 73/40.7
[58] Field of Search ........................................ 73/40.7

[56] References Cited

U.S. PATENT DOCUMENTS 3,721,117  3/1973  Ford et al. ............................ 73/40.7
3,914,983  10/1975  Umezu ................................. 73/40.7

FOREIGN PATENT DOCUMENTS 139899  1/1980  German Democratic Rep. ................................... 73/40.7
 36745  3/1980  Japan ................................... 73/40.7
1273379  5/1972  United Kingdom ................. 73/40.7
2000300  6/1978  United Kingdom ................. 73/40.7

Primary Examiner—Stewart J. Levy
Assistant Examiner—Joseph W. Roskos
Attorney, Agent, or Firm—John R. Benefiel

[57] ABSTRACT

Apparatus is disclosed for detecting minute leaks in wheel rims, including a bell jar cover lowered over a rim previously placed in position on a support member, engagement of surfaces on the cover and support member with the tire bead flanges of the wheel rim creating a separate hermetically sealed interior and exterior test chamber, each defined in part by the periphery of the wheel rim. These testing chambers are first evacuated, and the exterior chamber then pressurized with a gas composed at least in part of a trace gas, while the interior chamber is placed at or below atmospheric pressure. A scavenging gas flow is initiated through the interior chamber after a brief delay, which flow is collected and directed to a trace gas sensor to detect the presence of trace gas in the interior chamber resulting from leakage through the wheel rim. In order to eliminate residual trace gas, each test chamber is evacuated and purged with air flow prior to opening of the housing and removal of the wheel rim tested.

25 Claims, 5 Drawing Sheets

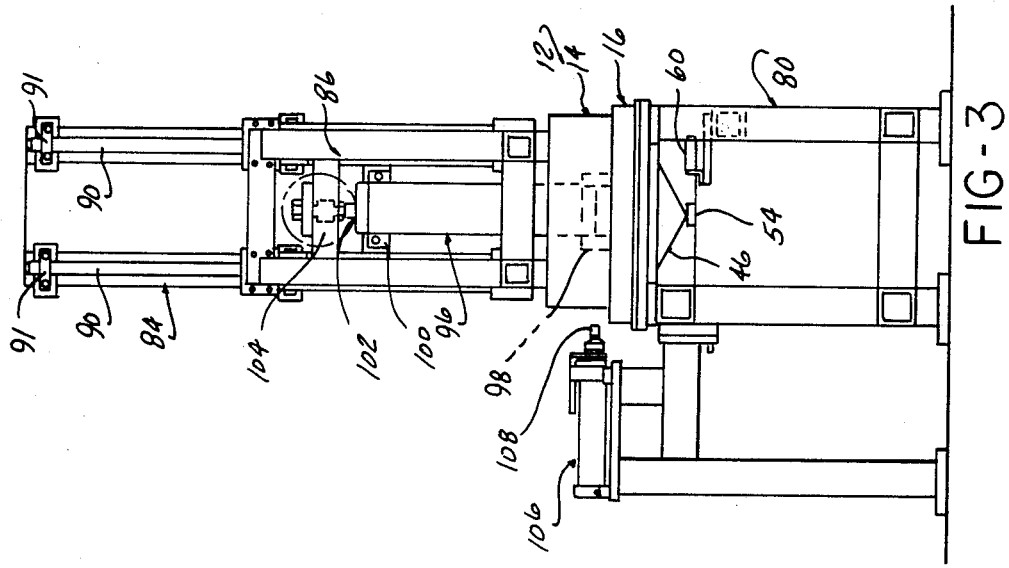
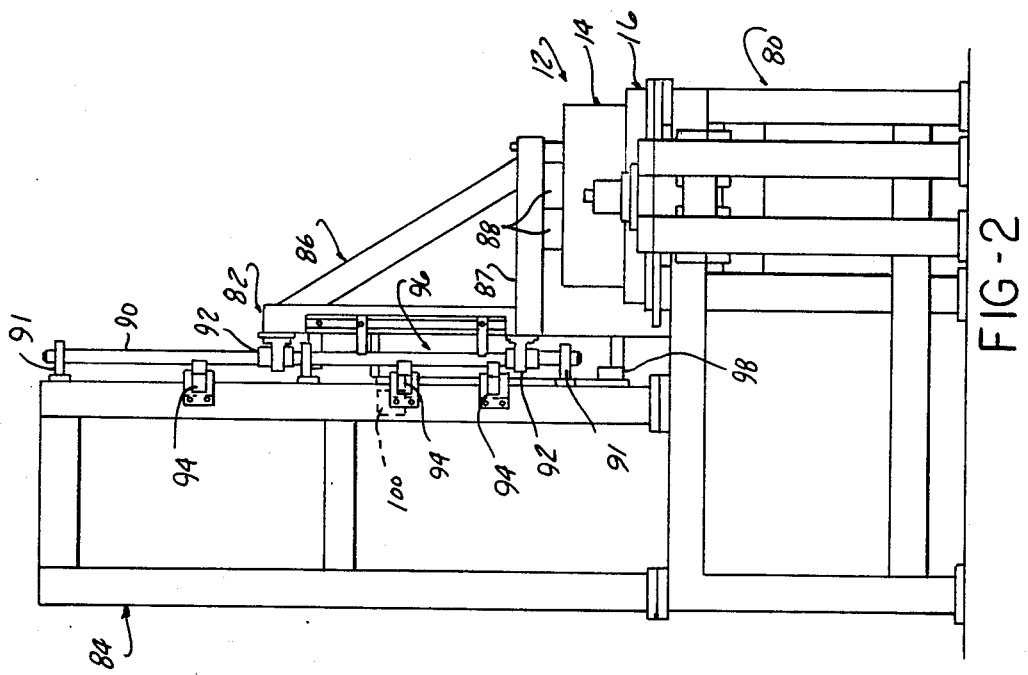

APPARATUS AND METHOD FOR LEAK TESTING AUTOMOTIVE WHEEL RIMS

This invention concerns leak testing and more particularly an apparatus and method for leak testing of automotive wheel rims of various sizes and configurations to detect leaks in the rim perimeter.

BACKGROUND OF THE INVENTION

Minute openings sometimes are present in the peripheral wall of automotive wheel rims after the manufacturing process is complete, which openings allow the escape of air while the rims are in service. The use of perfectly sealed rims is necessitated by "tubeless" tires, i.e., tires which do not employ inner tubes. Such openings commonly may be extremely minute and yet at normal inflation pressures (32 psig), allow sufficient air to escape to cause very gradual deflation of the tire, creating an increased need for tire servicing to maintain proper inflation pressures.

Auto wheel rims are configures in a large number of varying sizes and configurations, such that fixturing for leak testing must be extensive if each fixture is adapted to a given rim size.

It is important in the production environment that tests be conducted quickly and reliably, and yet very minute leaks must be detected in order to eliminate the problem of gradual tire deflation.

So called "trace" gas methods are known which are capable of quickly detecting minute leaks.

It is an object of the present invention to provide a method and apparatus for leak testing of auto tire wheel rims which is able to quickly detect very minute leaks through the rim peripheral wall.

It is yet another object of the present invention to provide such a method and apparatus which will readily accomodate wheel rims of varying sizes and configuration with the use of a single fixture.

It is an object to provide a trace gas leak detection method and apparatus which enables such rim leak testing. while providing reliable test results to be adapted to production testing of wheel rims.

SUMMARY OF THE INVENTION

These and other objects of the present invention which will become apparent upon a reading of the following specification and claims are achieved by an apparatus and method which includes the use of fixturing comprised of a multi-part housing having a bell jar cover and a generally planar support member, movable apart to enable positioning of a rim on the support member and thereafter moveable together to enclose a rim to be tested. When the cover and support member move together, inside surfaces engage each of the tire bead flanges on either side of the rim, so as to establish an interior testing chamber and an exterior testing chamber, each hermetically sealed.

The interior testing chamber is defined by the interior space within the peripheral wall of the rim and interior portions of the housing parts, while the exterior testing chamber is defined in part by the outer perimeter of the rim body and other interior portions of the housing parts.

The movement of the housing parts accommodates varying sizes and configurations of rims to be tested, with housing sealing means sealing the housing parts in any position after they are moved into seating engagement with the rim flanges. The housing sealing means may take the form of an inflatable seal interposed and inflated to seal a clearance space between housing cover and support member.

The fixture further includes a plug shaped upper "stuffer" member fixed on the support member and adapted to substantially occupy the interior space of the rim to be tested, with an annular clearance space therebetween such as to reduce the occupied volume of the interior testing chamber.

There may also be provided a conical lower stuffer member fixed to extend below the support member, which is surrounded by a funnel-shaped shroud to define an annular lower clearance space therebetween which is aligned with the clearance space between the upper stuffer and the rim to be tested. The support member is provided with a plurality of through openings providing communication between the respective clearance spaces to allow an outflow of fluid in the upper clearance space through the lower clearance space to an outlet port.

According to the concept of the method of the present invention, the rim to be tested is placed within the housing, and housing parts are moved to engage the rim flanges and establish both the interior and exterior testing chambers. After sealing of the housing parts, the exterior testing chamber is pressurized with a gas composed at least in part of a trace gas, such as halogen. After a slight dwell period to allow accumulation of trace gas by flow through any leaks, the interior testing chamber is scavenged by a low volume collecting gas flow passing through the upper clearance space and then via the lower clearance space, to a trace gas detector.

The detection of a trace gas in the collecting gas flow indicates the existence of a leak in the wheel peripheral wall.

Prior to the test, the chambers are initially evacuated by connecting each testing chamber to a vacuum source developing different levels of vacuum, with the subsequent developed vacuum in each chamber monitored to verify that differing vacuum levels are developed in the respective testing chambers.

If similar vacuum levels are developed in each testing chamber, a malfunction indication is triggered since the development of similar vacuum levels in each testing chamber will be caused by various abnormal conditions, i.e., the absence of a rim in the housing, improper seating of the rim or the presence of a gross leak in the rim peripheral wall.

After the test has been conducted, the interior and exterior testing chambers are again evacuated and purged with a high volume flow of purging gas such as purified air or nitrogen prior to unsealing of the housing, the purging preventing the accumulation of trace gas in the housing spaces which could cause a false reading in a subsequent test.

The collecting air flow is introduced through a "blow" ring located in the upper portion of the housing cover part approximately aligned with the annular clearance between the upper stuffers and the rim, and provides a rapid movement of collected fluid from the clearance space, particularly for an heavier-than-air trace gas component, such as halogen.

DESCRIPTION OF THE DRAWINGS

FIG. 2 is a side elevational view of the fixture assembly and related apparatus according to the present invention.

FIG. 3 is a front elevational view of the fixturing assembly and related apparatus shown in FIG. 2.

DETAILED DESCRIPTION

In the following detailed description certain specific terminology will be employed for the sake of clarity and a particular embodiment described in accordance with the requrements of 35 USC 112, but it is to be understood that the same is not intended to be limiting and indeed should not be so construed inasmuch as the invention is capable of taking many forms and variations within the scope of the appended claims.

Figure 1:
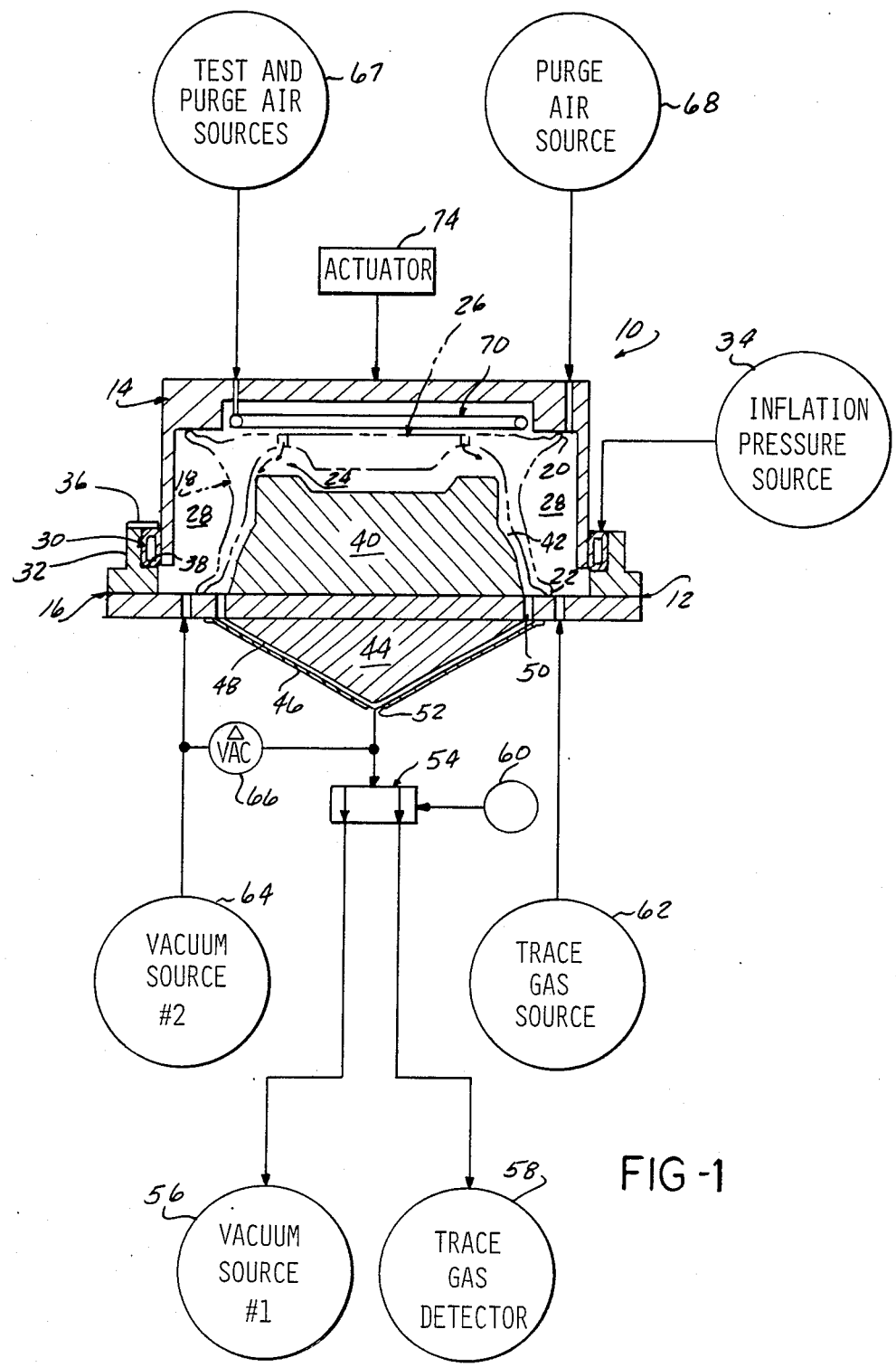
FIG. 1 is a diagrammatic representation of the apparatus according to the present invention.

Referring to the drawings and particularly, FIG. 1, the apparatus 10 according to the present invention is depicted in diagrammatic form. This includes a multi-part housing assembly 12 comprised of an open ended "bell jar" type cover 14, and a generally planar support member 16, fit together and configured to receive and enclose a generally cylindrical rim 18 to be tested. The housing assembly cover 14 and support member 16 are relatively movable together to enable sealing engagement with tire bead flanges 20 and 22 of rims 18 over a range of sizes. The sealing engagement of the flanges 20 and 22 establishes two hermetically sealed testing chambers. This includes an interior testing chamber 24 comprised in part of the interior space lying within the peripheral wall of the rim 18 and portions of the housing assembly 12. The interior space lies both above and below a central hub 26 of the typical rim 18, inasmuch as hub 26 contains stud holes and other openings such as to allow free fluid communication through the hub 26. A second, exterior sealed chamber 28 is defined in part by the exterior of the outer peripheral wall of the wheel rim 18 and in part by portions of the interior surfaces of the mating housing parts 14 and 16.

The cover 14 and support member 16 are telescoped together such as to accomodate wheel rims of varying depths such that a single fixture may be utilized for leak testing of a number of differing wheel rim sizes.

Sealing means are provided which will establish a hermetically tight seal between the housing parts 14 and 16 in any adjusted position of these parts upon seating on a wheel rim 18 to be tested. The sealing means as indicated in FIG. 1 comprises an inflatable seal 30 disposed in an annular clearance space between the outer perimeter of the cover 14 and the inside surface of a ring 32 mounted on the support member 16. The inflatable seal 30 is adapted to be inflated after placing the rim 18 in place and moving the housing members 14 and 16 together, which inflation is accomplished by connection to a source 34 of compressed air. A confining disc 36 is shown attached to the ring 32 to cause the inflatable seal 30 to expand and be seated against an opposing surfaces formed by a shoulder 38 formed in the ring 32.

The fixture 12 further includes an upper "stuffer" member 40 which is generally plug shaped to be received within inside the wheel rim 18 to be tested, such as to greatly reduce its unoccupied volume by creating an annnular upper clearance space 42 therebetween in the lower section of the wheel rim 18 beneath the hub 26. The plug shaped upper stuffer 40 is suitably sized to accomodate the various sizes of wheel rims to be tested in the fixture 12.

Means are provided beneath the support member 16 to collect flow through the clearance space 42, which may advantagously take the form of a conically shaped lower stuffer member 44 over which is received a funnelshaped shroud 46, sized to create a lower clearance space 48 therebetween which is substantially aligned with the upper clearance space 42.

A series of through passages 50 are formed extending through the support member 16 aligned with the clearance spaces 42 and 48 such as to establish fluid communication therebetween. The lower portion of the shroud 46 is truncated to form an outlet port 52 to receive fluid flow passing through the respective clearance spaces 42 and 48.

The outlet port 52 is in fluid communication with a two way valve 54 which is operable by an actuator 60 to connect the outlet port 52 either with a vacuum source 56 or a trace gas sensor 58.

According to the concept of the present invention, one of either of the interior sealed testing chamber 24 or the exterior sealed testing chamber 28 is pressurized with a source 62 of a gas composed at least in part of a trace gas, such as halogen, at a greater pressure than the other of the sealed testing chamber 24 or 28.

Preferably, it is the exterior testing chamber 28 which is pressurized with the trace gas source 62, selectively placed in communication therewith to be pressurized at the proper time to conduct the leak testing.

Prior to such pressurization, the exterior chamber 28 is initially evacuated by being connected to a vacuum source 64 in order to remove the air to minimize the dilution of trace gas and to provide much more rapid distribution of the trace gas into the exterior chamber 28 at the beginning of the leak test.

The interior chamber 24 likewise is also initially evacuated by means of a connection to the first-mentioned vacuum source 56.

According to one aspect of the present invention, the vacuum level developed by the vacuum source 56 and the vacuum source 64 are selected to be of differing values, such that a differential vacuum detector 66 may be employed to verify that different vacuum levels are developed in the respective sealed chambers 24 and 28. Development of a differential vacuum level in testing chambers 24 and 28 provides an indication of the presence of the rim 18 and proper seating thereof to establish the sealing of the wheel rim 18 against the housing parts. The absence of differential vacuum levels also may indicate a gross leak in the peripheral wall of the rim 18. This provides such indication since the vacuum sources 56 and 64 respectively will be unable to generate a different vacuum level in the respective testing chambers 24 and 28 if free fluid communication exists between testing chambers 24 and 28. Upon detection of an equal vacuum level condition by the differential vacuum detector 66, an appropriate indication can be generated to abort the test at this point.

After each of the interior testing chamber 24 and exterior testing chamber 28 have been evacuated, trace gas source 62 is placed in communication with the exterior chamber 28 so as to be pressurized with a trace gas containing fluid. At the same time the interior sealed testing chamber 24 is connected to a source of air pressure 67 which may be below or at slightly greater than atmospheric pressure. The outlet port 52 is disconnected from the vacuum source 56, and, after a brief dwell time, the actuator 60 is activated to connect the outlet port 52 to be in communication with the trace gas sensor 58. This allows a "collecting" air flow to be established through the interior chamber 24, thus scavenging the interior testing chamber 24. The collecting air flow is directed through the upper clearance space 42 and the lower clearance space 48, funneling the air flow to the outlet port 52.

This arrangment affords a very rapid movement of any trace gas constituents collected to the trace gas sensor 58 due to the confining and directing effect of the upper stuffer 40 by creating the clearance space 42. The slight dwell time before establishing the collecting air flow allows the accumulation of any trace gas in the clearance space which may occur because of the presence of minute leaks in the peripheral wall of the wheel rim 18.

The trace gas is introduced at a relatively high pressure in the exterior chamber 28, preferably in a range of pressures encountered in service conditions, i.e. 32–50 psig, such that with the interior chamber 42 at substantially atmospheric pressure a simulation of service conditions of the rim with a fully inflated tire installed thereon is established. Thus, any minute openings which will allow air leakage under service conditions can be detected by sensing the presence of trace gas in the collecting air flow. Commercially available trace gas sensors 58 are capable of detecting extremely minute concentrations of halogen so as to be suitable for detecting the leaks of the order of magnitude described.

After completion of the leak test, the interior sealed chamber 24 and exterior sealed chamber 28 are again evacuated to remove any trace gas containing air and purged with a suitable gas such as purified air or nitrogen as from a pressurized source 70, connected with the exterior chamber 28.

Testing and purging air flow from the pressurized air source 67 is preferably introduced into the interior chamber 24 by means of a flow distributing "blow" ring 70 formed of hollow tubing and disposed in the upper region of the interior chamber 42 above the hub section 26 of the rim 18 to be tested. The blow ring 70 receives air flow from the pressurized air source 67 and is provided with a number of downwardly directed outlets such as to distribute the testing (and purging) air flow in a generally annular pattern around the interior perimeter of the wheel rim 18, generally aligned with the clearance space 42. As noted, the test air flow acts as a collecting and scavenging flow to collect any trace gas containing air, initiated by movement of the valve 54 to allow outflow to the trace gas sensor 58.

After purging, the cover 14 and support member 16 are moved apart to allow removal of the wheel rim 18. a suitable mechanism 74 is employed to enable automatic separation of the housing members 14 and 16 and also to hold these components firmly together in sealing engagement with the wheel rims 18, resisting the relatively high pressure existing in the exterior chamber 28 during the leak testing step.

Referring to FIGS. 2 and 3 the fixturing 12 and related structure is shown, mounted in a support frame 80 comprised of a welded frame members, providing a support for the support member at a suitable height for loading and unloading of wheel rims into the fixturing 12. The cover 14 is adapted to be raised and lowered by means of slide assembly 82 supported on upper frame section 84. The slide assembly 82 includes an angle bracket 86 having a lower member 87 affixed to mounting pads 88, in turn welded to the upper surface of the cover 14. The bracket 86 is mounted for guided up and down sliding movement on spaced guide shafts 90 supported on the upper frame 84 with spaced bearing 92 affixed to the bracket 86 allowing guided up and down movement of the bracket 86 on the guide shafts 90. Limit switches 94 may be provided to provide suitable control signals corresponding to the position of the cover 14.

The bracket 86 and attached cover 14 are raised and lowered by means of a double acting hydraulic cylinder 96 secured to the upper frame 84 as of brackets 98, 99 and 100. The hydraulic cylinder 96 is provided with an output actuator shaft 102 attached to a cross member 104 included in the bracket 86 such as to be raised by pressurization of the cylinder and extension of the actuator shaft 102. As noted above, the cover 14 must be held in the lowered position by means of the cylinder 96, resisting the trace gas pressure introduced into the exterior chamber 28 as seen in FIG. 1. Accordingly it may be desirable to augment the double acting hydraulic cylinder 96 with a suitable mechanical wedge or other mechanism as required (not shown). There also may be provided a suitable cylinder marker device 106 of the type commercially available having a marking head 108 adapted to upon actuation to cause a suitable "OK" marking of the rim 18 upon successful completion of the leak test, in the manner generally well known to those skilled in the art.

Figure 4:
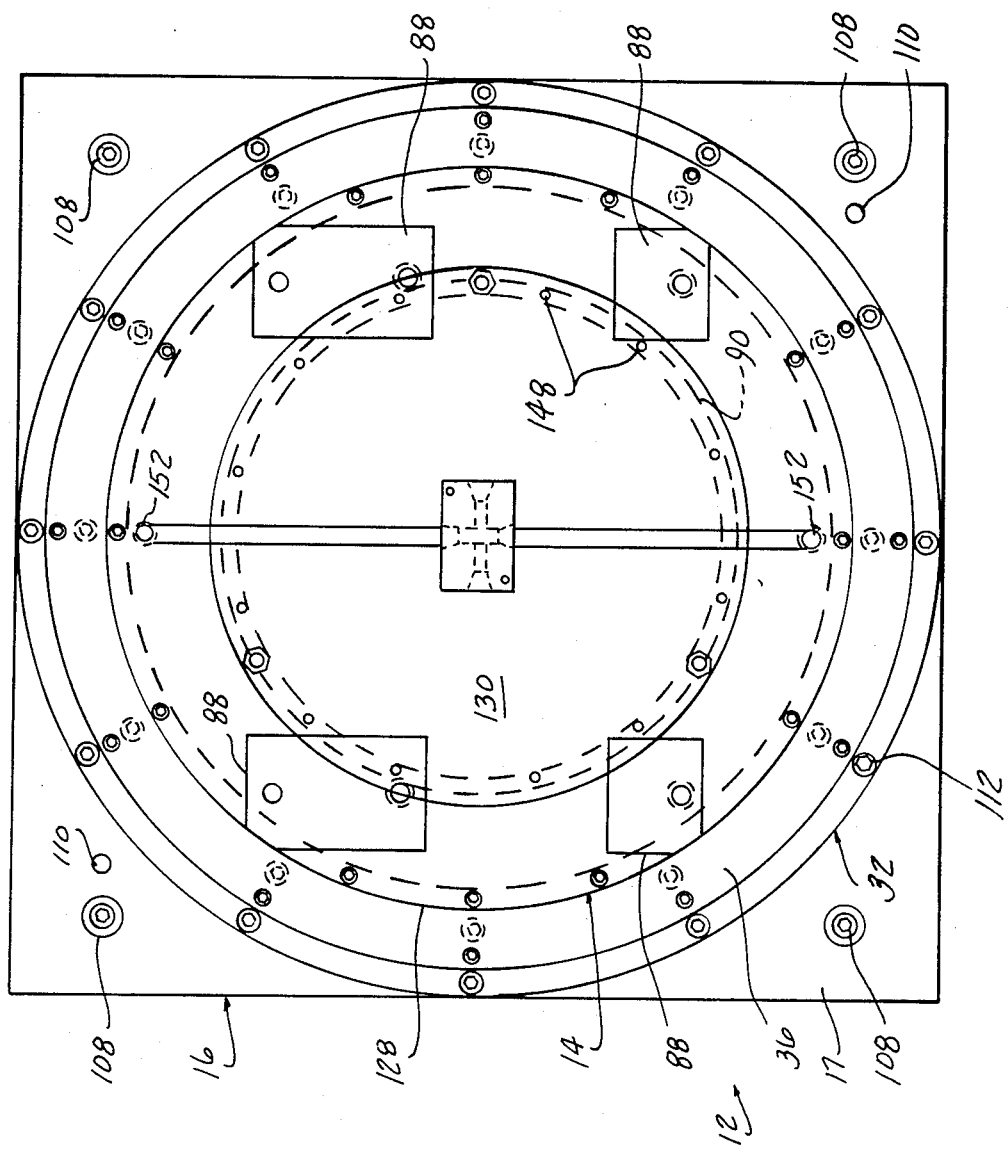
FIG. 4 is a plan view of a housing assembly included in the fixturing shown in FIGS. 2 and 3.
Figure 5:
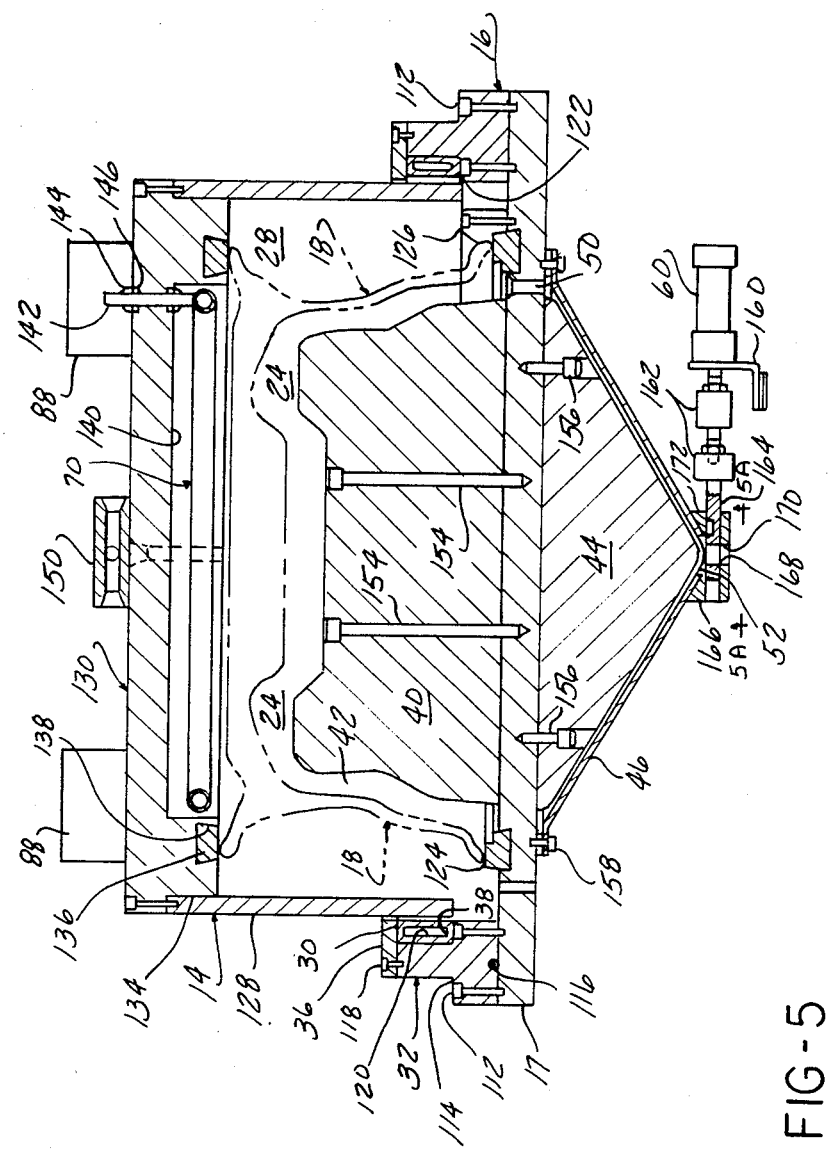
FIG. 5 is a sectional view of the housing assembly shown in FIG. 4.
Figure 5A:
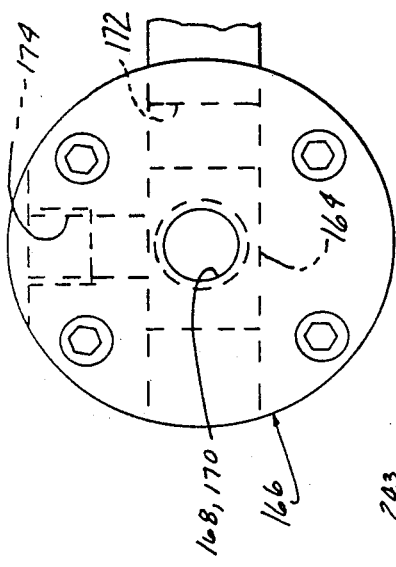
FIG. 5A is a view taken in the direction of the arrows AA in FIG. 5.

Referring to FIGS. 4, 5 and 5A, the details of the fixture 12 can be understood. The support member 16 includes a generally rectangular base plate 17, such as of heavy gauge steel to be of suitably sturdy construction to afford adequate stiffness. The base plate 17 is adapted to be fastened to the frame 80 by cap screws 108 with location dowels 110 also provided to ensure adequate location of the fixturing 12 with respect to the slide assembly 82. Affixed to the base assembly 17 is a ring 32 secured by means of cap screws 112 passing through a flange portion 114 formed therein. A gasket 116 ensures a fluid type joint between the ring 32 and the base plate 17. A confining annular disc 36 is similarly secured by means of cap screws 118 threaded into bores in the upper surface of the ring 32. The inflatable seal 30 lies in a space provided beneath the inwardly projecting overhang of the confining disc 36 and shoulder 38 machined into the ring 32 such that the inflatable seal 30 is confined to cause to be expanded outwardly and seal against the outside of the cover 14 and the inside face 120 of the ring 32. Additional cap screws 122 extending through the shoulder 38 and into the base plate 17 as indicated, are to ensure firm seating of the ring 32 against the upper surface of the base plate 17.

Received within an annular recess in the base plate 17 is a stepped sealing ring 124 which is adapted to engage wheel rims 18 of differing configurations, with the step shown providing a locating feature for correct positioning of wheel rims of a smaller diameter. A series of retainer segments 126 are provided, spaced about the outer perimeter of the sealing ring 124 to provide an additional locating feature for larger diameter wheel rims 18 as shown on the right hand side of FIG. 5. The retaining segments 126 also serve to retain the sealing ring 124 within the recess in base plate 17.

The cover 14 as shown in FIG. 5 is of a two piece construction including a cylindrical body member 128 and a circular top 130, secured together by means of cap screws 132. The body member 128 is received over the outside diameter of a reduced diameter section 134 of the top 130. The diameter of the body 128 is received within the inner diameter of the disc 36, with a clearance space therebetween as indicated, in order to provide free movement of the cover 14 within the ring 32 as shown with the clearance space being taken up and sealed by expansion of the inflatable seal 30.

An upper sealing ring 136 is provided to engage the upper flange of the wheel rims 18 and is of a suitable thickness such as to be engaged with the upper flange of the wheel rim 18 of the range of diameters of the wheel rims to be tested. The upper sealing ring 136 is forced into an undercut recess 138 as shown machined into the top 130 of the cover 14 such as to be securely retained therein.

The blow ring 70 is mounted within a recess 140 formed in the top 130, affording clearance for hubs 26 of the larger rim sizes. Blow ring 70 is supported by a series of threaded tubes 142 received within through openings formed in the top 130 retained with nuts 144 and sealed by means of gaskets 146. The lower end of the threaded tubes 142 are welded into the openings of the side wall of the upper side of the blow ring 70 such as to provide a means for providing fluid communication to the interior of the blow ring 70. The blow ring 70 as best seen in FIG. 4 is provided with a series of downwardly directed circumferentially spaced openings 148 to provide a distribution of testing and purging air flow in a ring pattern approximately aligned with the clearance space 42 between the upper stuffer 40 and the interior of the rim 18.

A manifold block 150 is also provided for distribution of air lines (not shown) to the threaded tube 142 as well as a pair of air lines to a purging opening 152 located extending through the top 130 adapted to receive suitable fluid connection fittings to the source of purging air to be directed into the outer exterior sealed chamber 28 described above in reference to FIG. 1.

The plug shaped upper stuffer 40 is provided, constructed of any suitable gas impervious material such as a shaped solid piece of aluminum metal, secured by means of cap screws 154 threadably received into the base plate 17 as shown.

Similarly, the lower stuffer 44 is secured by means of upwardly directed cap screws 156 received into the undersurface of base plate 17.

The funnel-shaped shroud 46 has a peripheral flange portion also secured by means of cap screws 158 extending upwardly threadedly received into the undersurface of base plate 17.

A suitable gate valving means is also shown in FIG. 5, comprised of an actuating air cylinder 60 mounted on a bracket 160 and adjustably connected by couplings 162 to a valve slide 164 received within a valve body 166. The valve slide 164 is formed with a through opening 168 adapted to be brought into alignment with a port 170 in communication with the trace gas sensor 58 as described above and below. A transverse groove 172 is formed in slide 164 aligned and in communication with a side port 174 as seen in FIG. 5A, when the actuator 60 has retracted the valve slide 164.

Port 174 is in communication with the vacuum source 56, not shown in FIG. 5, to thus control communication of the outlet port 52 alternatively with the vacuum source 56 or with the trace gas sensor 58.

Figure 6:
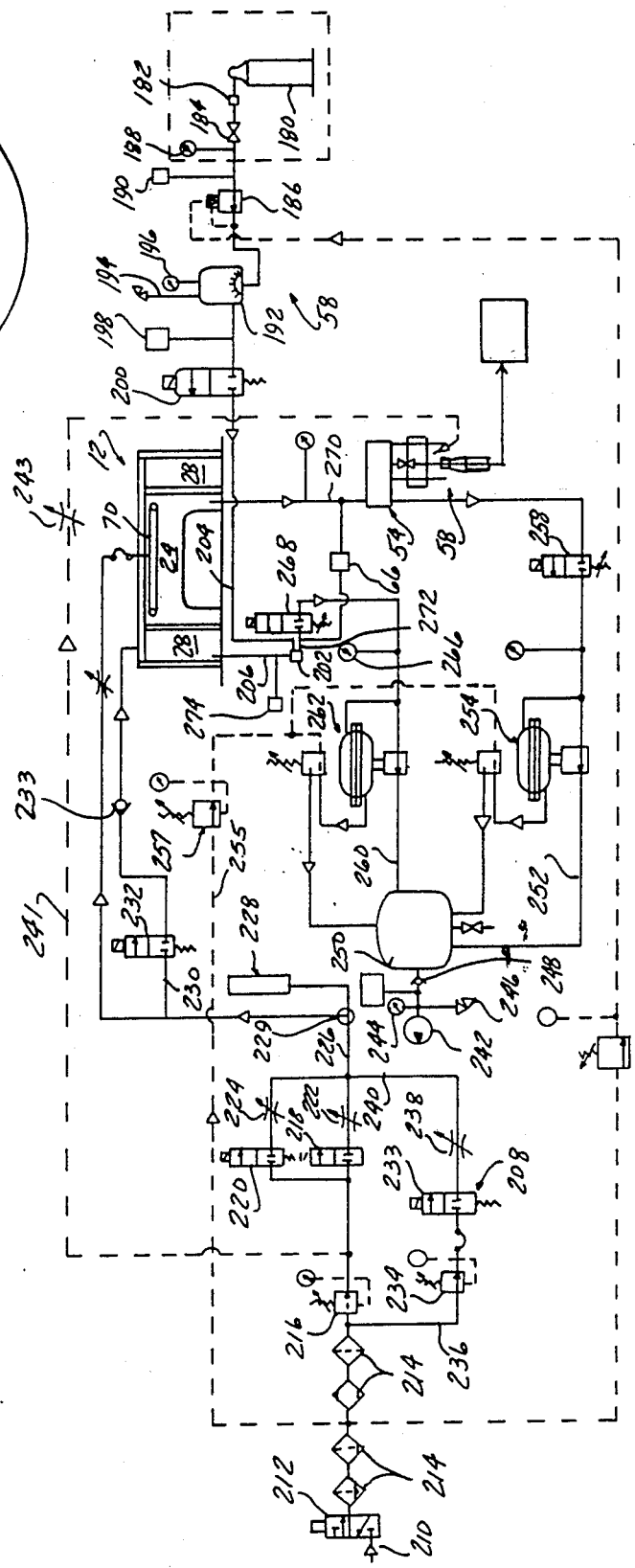
FIG. 6 is a schematic representation of the fluid circuitry associated with the fixturing according to the present invention.

Referring to FIG. 6, a suitable fluid circuit for use with the fixturing described above is shown in schematic form and includes a trace gas supply network 62, adapted when activated to provide a connection of gas under pressure composed at least in part of a suitable trace gas such as halogen to the exterior testing chamber 28 as described.

This gas supply network 58 may include a tank 180 as shown containing either pure halogen gas or any of a range of trace gas concentration as low as 6% halogen mixed with suitable carrier gas such as air, or nitrogen, as required for the particular application, and the particular trace gas sensor utilized. Tank 180 is connected to a manifold 182 allowing a number of tanks to be connected together, a shut-off valve 184, and a suitable pressure regulator 186. The pressure regulator is set at the desired test pressure, i.e., 32 psig or higher for a typical application. A pressure indicator gage 188 may also be provided as well as a high pressure enablement switch 190 which is energized only when the set pressure level exists within the reservoir 180 for conducting of the leak test.

The regulator 186 is connected to a accumulator mixing chamber 192 which may be provided with a pressure relief valve 194 and an indicator gage 196. A second enablement pressure switch 198 may also be provided to enable initiation of the leak test only when the regulated pressure is reached downstream of the accumulator 192. A suitable solenoid control valve 200 is provided to control connection of the halogen pressure source 58 with the fixture 12 as described and is connected via a manifold 202 with the exterior sealed chamber 28 by fluid lines 204 and 206 respectively.

Purging and test air is provided by a network air supply circuit 208, which may receive air from a source such as "shop" air via line 210 through a control valve 212 and a series of suitable filters and driers indicated at 214 to ensure clean, oil-free and dry air for use in the apparatus. Test air is provided via a regulator 216 which is set to provide air at slightly over atmospheric pressure, i.e., 2 to 5 psig, such as to ensure a air flow while maintaining substantially atmospheric pressure conditions downstream.

Downstream of the regulator 216 there is provided a pair of solenoid operator test flow selector valves 218 and 220 which cause communication of flow adjusting valves 22 or 224 to be connected with line 226 to the interior sealed chamber 24. This allows differing test flow rates which may be calibrated by means of the flow meter 228 and diverter valve 229 for varying clearance spaces 42 corresponding to different rim diameters. A test air flow is directed via the blow ring 70 and adjuster valve 235 into the interior space 24.

Communication of a branch line 230, to the exterior sealed chamber 28 is controlled by a solenoid valve 232 and check valve 233 such as to allow purging air flow to be directed therein as described. A higher pressure is provided for purging air flow by means of a second regulator 234 provided in branch line 236 set to a somewhat higher pressure, i.e. 25 to 30 psig with a suitable control valve 236 provided downstream of the regulator 234 and a flow adjusting valve 238.

Accordingly, the higher pressure and flow rates of purge air are directed via line 240 to both the interior testing chamber 24 and the exterior testing chamber 28 during that period in the test cycle when purging air flow is directed to the respective interior and exterior chambers 24 and 28 as described above.

A tap line 241 may also be provided with flow adjusting valve 243 to provide a constant purging air flow to the vicinity of the halogen sensor 58 to protect the sensor 58 from the contaminated ambient air and to dispel any residual test halogen after a defective rim 18 has as a result been encountered and halogen trace gas has been directed to the vicinity of the sensor 58.

A vacuum pump 242 provides a common vacuum source, and the first branch line 252 is in communication with a pilot operated precision regulator arrangement 254 operated by air pressure in line 255 and regulator 257 which sets a first vacuum level in line 254 downstream thereof, a suitable vacuum gage 256 being provided. A solenoid operated control valve 258 controls communication of the vacuum to the slide selector valve 54 and a second branch line 260 is connected with a second pilot operated regulator arrangement 262 such as to establish a second vacuum level in line 264 downstream of the regulator 262 with gage 266 being provided to monitor the vacuum level. The line 264 is connected with a solenoid control valve 268, in turn communicating with the manifold 202 to establish controllable communication of the exterior sealed chamber 28 upon energization of the solenoid valve 268.

A diffential pressure detector 66 is connected between line 270 and 272 such as to detect the difference in vacuum actually developed in interior sealed chamber 24 and exterior sealed chamber 28 upon application of the vacuum sources 56 and 64 to the respective testing chambers 24 and 28. In the event the rim to be tested is absent, mispositioned, or has a gross leak, the inability to achieve the vacuum differential will provide an indication of a test fault condition. An enablement vacuum switch 274 may also be provided which enables test only upon achievement of vacuum levels of the appropriate magnitude.

Accordingly, it can be appreciated that a relatively simple fixturing and apparatus has been provided for detection of very minute leaks in rims and which fixturing is easily able to accomodate varying wheel sizes and configurations. The test is suited to relatively high speed operation and yet provides highly accurate results such as to be feasible for application in production testing of wheel rims for pneumatic tires and thus the above recited objects of the present invention have been achieved by the apparatus and, method disclosed.

We claim:

1. Apparatus for leak testing auto wheel rims for pneumatic tires, said wheel rims having an interior space defined by a rim body having a generally cylindrical peripheral wall and having an annular tire bead flange on either side of said rim body including:

a fixture comprised of a housing means configured to receive and enclose a rim to be tested with a clearance space between said housing interior and the perimeter of said rim, said housing means including a plurality of parts relatively movable to allow said rim to be placed within said housing and to engage said respective tire bead flanges on a rim placed therein so as to establish an interior and an exterior sealed testing chamber, said interior chamber comprised by said rim body interior space and said housing, and said exterior chamber comprised of said housing and said rim body peripheral wall; one of said housing parts comprising a support member defining a surface on which said rim to be tested may be placed with one of said flanges resting thereon and another of said housing parts comprises a generally cylindrical bell jar cover having an open end configured to be positioned over and enclose a rim resting on said support plate, said cover including an interior surface configured to engage the other of said rim flanges when in position over said rim, and said housing means including selectively actuatable sealing means acting between said support member and said cover to create a hermetically tight seal therebetween; said support member including an upstanding ring portion configured to receive said cover with a clearance space therebetween and of a substantial height to allow telescoping adjustment of the bell jar car cover therein to accommodate varying rim depths.

2. Apparatus according to claim 1 wherein said sealing means includes an inflatable seal disposed in said clearance space, and also means for selectively inflating said inflatable seal.

3. Apparatus according to claim 1 wherein said support member includes a stepped sealing ring configured to engage flanges of varying sizes.

4. Apparatus according to claim 3 wherein said cover includes a sealing ring within said cover configured to engage said other rim flanges of varying sizes.

5. Apparatus according to claim 1 further including a plug-shaped upper stuffer member affixed to said support member centrally on said support member surface to be received within the interior space of a rim to be tested to reduce the unoccupied volume of said space and sized to create a clearance space between said upper stuffer member and said rim to be tested.

6. Apparatus according to claim 5 wherein said support member includes one or more openings aligned with said clearance space between said upper stuffer member and said rim to be tested to allow gas flow out from said clearance space and through said one or more openings.

7. Apparatus according to claim 6 further including a conically shaped lower stuffer member affixed below said support member and a surrounding funnelshaped member positioned over said lower stuffer with a clearance space therebetween, said clearance space aligned with said clearance space between said upper stuffer and said rim to be tested so as to receive outflow of gas passing through said one or more openings in said support member.

8. Apparatus according to claim 7 further including a blow ring comprised of a hollow tube mounted within said cover to be aligned above said rim interior space, said blow ring formed with a plurality of circumferentially spaced downwardly directed openings to enable gas flow into said clearance space between said upper stuffer and said rim to be tested.

9. Apparatus according to claim 1 further including trace gas source means for pressurizing one of said sealed chambers with a gas composed at least in part of a trace gas and collection means for establishing a flow of a gas through said other sealed chamber by introducing a test gas into said other sealed chamber and collecting said gas in said other sealed chamber including passing through the other of said sealed chambers, detector means for detecting any trace gas in said gas collected in by said collection means, whereby leaks in said rim may thereby be detected.

10. Apparatus according to claim 9 further including vacuum source means for initially evacuating each of said sealed chambers prior to pressurizing said one chamber and passing gas flow through the other of said chambers.

11. Apparatus according to claim 9 wherein initiation of said flow of gas through said other sealed chamber is delayed until slightly after said one sealed chamber is pressurized by said trace gas source means.

12. Apparatus according to claim 9 further including purge means for creating a purging gas flow through each of said sealed chambers after each leak test prior to unsealing said housing means.

13. Apparatus according to claim 12 further including means for evacuating each of said sealed chambers prior to creating said purging gas flow.

14. Apparatus according to claim 9 further including a conically shaped lower stuffer member affixed below said support member and a surrounding funnelshaped member positioned over said lower stuffer with a clearance space therebetween, said clearance space aligned with said clearance space between said upper stuffer and said rim to be tested so as to receive outflow of gas passing through said one or more openings in said support member, wherein said collection means gas flow passes through said clearance space.

15. Apparatus according to claim 14 further including a blow ring comprised of a hollow tube mounted within said cover to be aligned above said rim interior space, said blow ring formed with a plurality of circumferentially spaced downwardly directed openings to enable fluid flow into said clearance space between said upper stuffer and said rim to be tested, wherein said blow ring comprises said collection means.

16. A method for leak testing a member having a shape defining an interior space, comprising the steps of:
positioning housing parts about said member so as to enclose said member and sealing said parts and said member to define an interior sealed chamber comprised in part by said housing and said interior space and an exterior sealed chamber defined in part by said housing and the exterior of said member;
pressurizing one of said sealed chambers with a gas composed at least in part of a trace gas; and
detecting any trace gas leaking through said member from said one sealed chamber into the other of said sealed chambers, said detecting step including the step of inducing a through flow of gas through said other sealed chamber and sensing the presence of any trace gas in said through flow of gas by directing said through flow of gas out of said other sealed chamber and over a trace gas sensor;
establishing a constant purging gas flow to the vicinity of said trace gas sensor free of any trace gas to create a protective gas screen from the ambient atmosphere and to dispel any residual trace gas after each test.

17. The method according to claim 16 further including the step of establishing a pressure in the other sealed chamber substantially at or below atmospheric pressure.

18. The method according to claim 16 wherein said step of inducing a through flow of gas is delayed until slightly after said pressurizing step.

19. The method according to claim 16 further including the step of evacuating each of said sealed chambers before and after said leak test.

20. The method according to claim 16 further including the step of purging each of said sealed chambers with a flow of gas prior to unsealing said housing parts and said member.

21. The method according to claim 20 wherein said purging gas flow is composed of a gas not sensed in said sensing step.

22. A method for leak testing a member having a shape defining an interior space, comprising the steps of:
positioning housing parts about said member so as to enclose said member;
and sealing said parts and said member together to define an interior sealed chamber comprised in part by said housing and said interior space and an exterior sealed chamber defined in part by said housing and the exterior of said member;
evacuating each of said sealed chambers before each leak test to different predetermined vacuum levels;
monitoring the difference in vacuum levels achieved in each sealed chamber to detect gross leaks between said sealed chambers as caused by improper seating of said member in said housing parts, by detecting any development of a condition of substantially the same vacuum level existing in each sealed chamber;
pressurizing one of said sealed chambers with a gas composed at least in part of a trace gas; and
detecting any trace gas leaking through said member from said one sealed chamber into the other of said sealed chambers, said detecting step including the step of inducing a flow of gas out of said other sealed chamber and sensing the presence of any trace gas in said gas induced to flow out of said other sealed chamber.

23. A method for leak testing a member having a shape defining an interior space, comprising the steps of:
positioning housing parts about said member so as to enclose said member;
and sealing said parts and said member together to define an interior sealed chamber comprised in part by said housing and said interior space and an exterior sealed chamber defined in part by said housing and the exterior of said member;
evacuating each of said sealed chambers before each leak test;
pressurizing one of said sealed chambers with a gas composed at least in part of a trace gas to a level substantially above atmospheric pressure; directing a through flow of a gas free from said trace gas at slightly above atmospheric pressure in a flow pattern distributed about the periphery said member; and
detecting any trace gas leaking through said member from said one sealed chamber into the other of said sealed chambers, said detecting step including the step of collecting and distributing a flow of gas through said other sealed chamber and sensing the presence of any trace gas in said collected gas flow chamber.

24. The method according to claim 23 wherein in said directing step a series of jets of said gas are formed distributed about the periphery of said member.

25. The method according to claim 24 wherein a heavier than air trace gas is employed and wherein in said collecting step, said gas flow is converged below said member to a central outlet.

* * * * *

UNITED STATES PATENT AND TRADEMARK OFFICE
CERTIFICATE OF CORRECTION

PATENT NO. : 4,754,638
DATED : July 5, 1988
INVENTOR(S) : Semyon Brayman and Vladimir Sheyman It is certified that error appears in the above-identified patent and that said Letters Patent is hereby corrected as shown below:

In the Abstract, line 11, "atmopsheric" should be --atmospheric--.

Column 1, line 22, "configures" should be --configured--.

Column 5, line 59, "a" should be --A--.

Column 8, line 51, "22" should be --222--.

Signed and Sealed this

Third Day of January, 1989

Attest:

DONALD J. QUIGG

Attesting Officer   Commissioner of Patents and Trademarks